United States Patent
Knott et al.

(10) Patent No.: US 10,518,905 B2
(45) Date of Patent: Dec. 31, 2019

(54) SYSTEM AND METHOD FOR ROTORCRAFT BLADE STORAGE

(71) Applicant: Textron Innovations Inc., Providence, RI (US)

(72) Inventors: Kevin Matthew Knott, Arlington, TX (US); Dominic Michael Przano, Fort Worth, TX (US)

(73) Assignee: TEXTRON INNNOVATIONS INC., Providence, RI (US)

( * ) Notice: Subject to any disclaimer, the term of this patent is extended or adjusted under 35 U.S.C. 154(b) by 277 days.

(21) Appl. No.: 15/645,671

(22) Filed: Jul. 10, 2017

(65) Prior Publication Data

US 2019/0009931 A1    Jan. 10, 2019

(51) Int. Cl.
| | | |
|---|---|---|
| *B64F 5/50* | (2017.01) | |
| *B64C 27/48* | (2006.01) | |
| *B65G 1/02* | (2006.01) | |
| *B64C 27/00* | (2006.01) | |
| *B64F 5/10* | (2017.01) | |

(Continued)

(52) U.S. Cl.
CPC ............. *B64F 5/50* (2017.01); *B64C 27/00* (2013.01); *B64C 27/48* (2013.01); *B64F 5/10* (2017.01); *B64F 5/40* (2017.01); *B65G 1/02* (2013.01); *A47B 81/005* (2013.01); *B60P 3/11* (2013.01); *B62B 3/102* (2013.01); *B64C 2201/20* (2013.01)

(58) Field of Classification Search
CPC ...... B64F 5/50; B64F 5/40; B64F 5/10; B64C 27/00; B64C 27/48; B64C 2201/20; B65G 1/02; B60P 3/11; B62B 3/102; B65D 2585/687; F03D 13/00; A47B 96/028; A47B 81/005
See application file for complete search history.

(56) References Cited

U.S. PATENT DOCUMENTS

| | | |
|---|---|---|
| 3,133,715 A | 5/1964 | Grunfelder |
| 3,744,742 A * | 7/1973 | Gear ................. B64C 27/50 |
| | | 244/17.11 |

(Continued)

OTHER PUBLICATIONS

"RHUPIS Blade Clamp P/N 1006800, NSN 1615-01-562-8156, Instruction Manual," McNally Industries, AeroPrecision, Feb. 18, 2014, downloaded from http://www.mcnally-group.com/mcnallyindustries/products/helicopter-tooling on Mar. 29, 2018, 13 pages.

(Continued)

*Primary Examiner* — Assres H Woldemaryam
(74) *Attorney, Agent, or Firm* — Slater Matsil, LLP

(57) ABSTRACT

A device is provided. The device includes a first pillar. The first pillar includes a bottom portion having an opening. The first pillar further includes a top portion coupled to the bottom portion by a middle portion. The top portion includes a plurality of shelves stacked along a common axis intersecting the bottom portion. Each of the shelves has a respective recess. The first pillar further includes a plurality of clamps. Each of the shelves has a respective clamp of the clamps. Each respective clamp and respective recess of the shelves forms an airfoil cross-sectional shape. The first pillar further includes a plurality of locks. Each of the shelves has a respective lock of the locks. Each of the locks has a first locking portion on respective shelves and a second locking portion on respective clamps of the shelves.

23 Claims, 16 Drawing Sheets

(51) Int. Cl.
  *B64F 5/40* (2017.01)
  *B62B 3/10* (2006.01)
  *A47B 81/00* (2006.01)
  *B60P 3/11* (2006.01)

(56) References Cited

U.S. PATENT DOCUMENTS

| | | | | |
|---|---|---|---|---|
| 3,802,798 | A * | 4/1974 | Hibyan | B64C 27/50 |
| | | | | 416/143 |
| 3,921,938 | A * | 11/1975 | Jupe | B64C 1/30 |
| | | | | 244/17.11 |
| 5,211,538 | A * | 5/1993 | Seghal | B64C 27/50 |
| | | | | 244/17.11 |
| 6,824,151 | B1 | 11/2004 | Tucei, Jr. | |
| 8,342,491 | B2 * | 1/2013 | Jorgensen | F03D 13/40 |
| | | | | 269/17 |
| 9,592,899 | B2 * | 3/2017 | Fink | B64C 1/063 |
| 2011/0187083 | A1 | 8/2011 | Storgaard Pedersen | |
| 2012/0192420 | A1 * | 8/2012 | Krogh | F03D 13/40 |
| | | | | 29/889 |
| 2013/0119002 | A1 * | 5/2013 | Frederiksen | B60P 3/40 |
| | | | | 211/60.1 |
| 2013/0216325 | A1 * | 8/2013 | Johnson | F03D 13/40 |
| | | | | 410/44 |
| 2014/0314576 | A1 * | 10/2014 | Lieberknecht | F03D 13/40 |
| | | | | 416/220 R |
| 2015/0285216 | A1 * | 10/2015 | Van Der Zee | A47B 81/00 |
| | | | | 414/802 |
| 2018/0105254 | A1 * | 4/2018 | Tian | B64C 1/30 |

OTHER PUBLICATIONS

"Ruphis Blade Clamp," McNally Industries, Products and Programs, Helicopter Tooling, downloaded on Mar. 29, 2018 from http://www.aeroprecision.com/pdf/McNally_RUPHIS_Blade_Clamp_Instruction_Manual.pdf, Mar. 29, 2018, 4 pages.

* cited by examiner

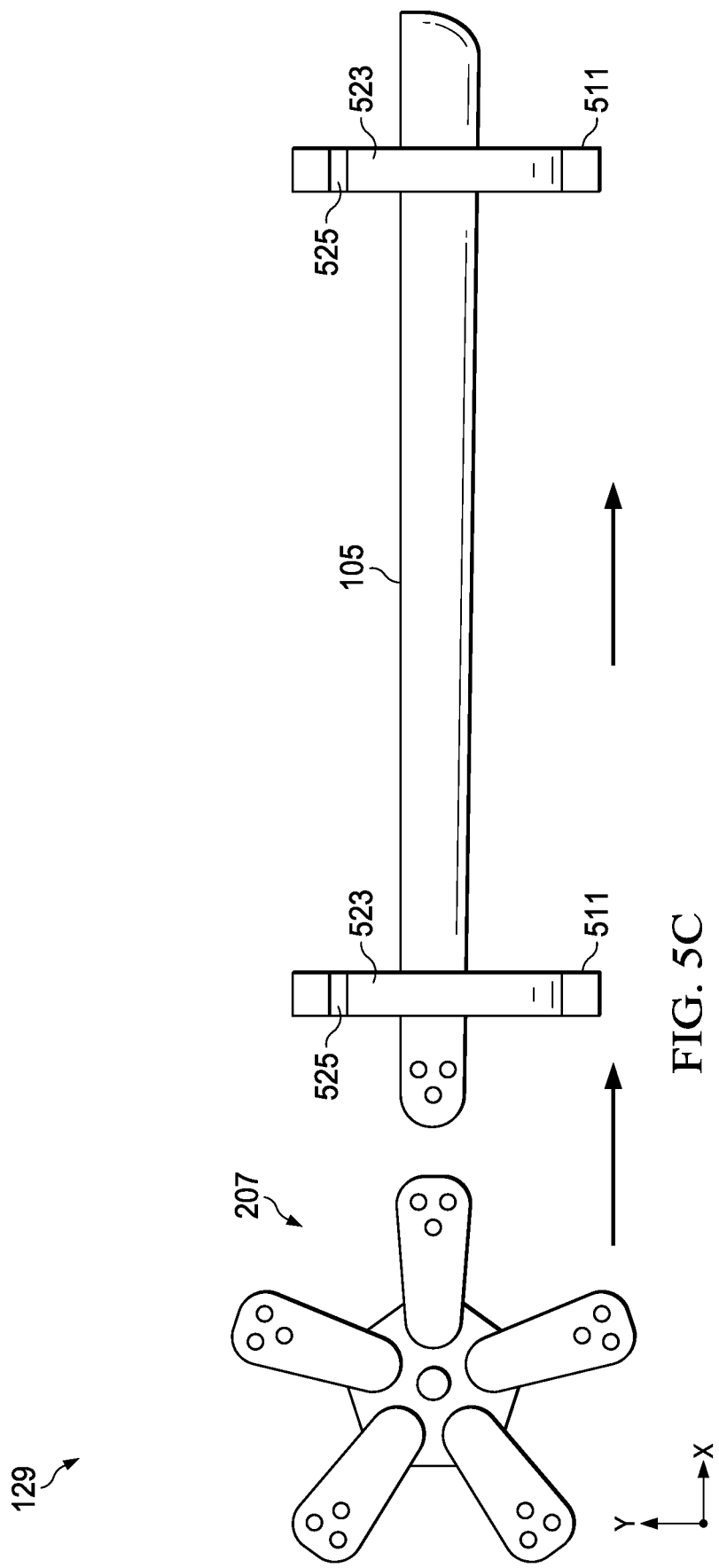

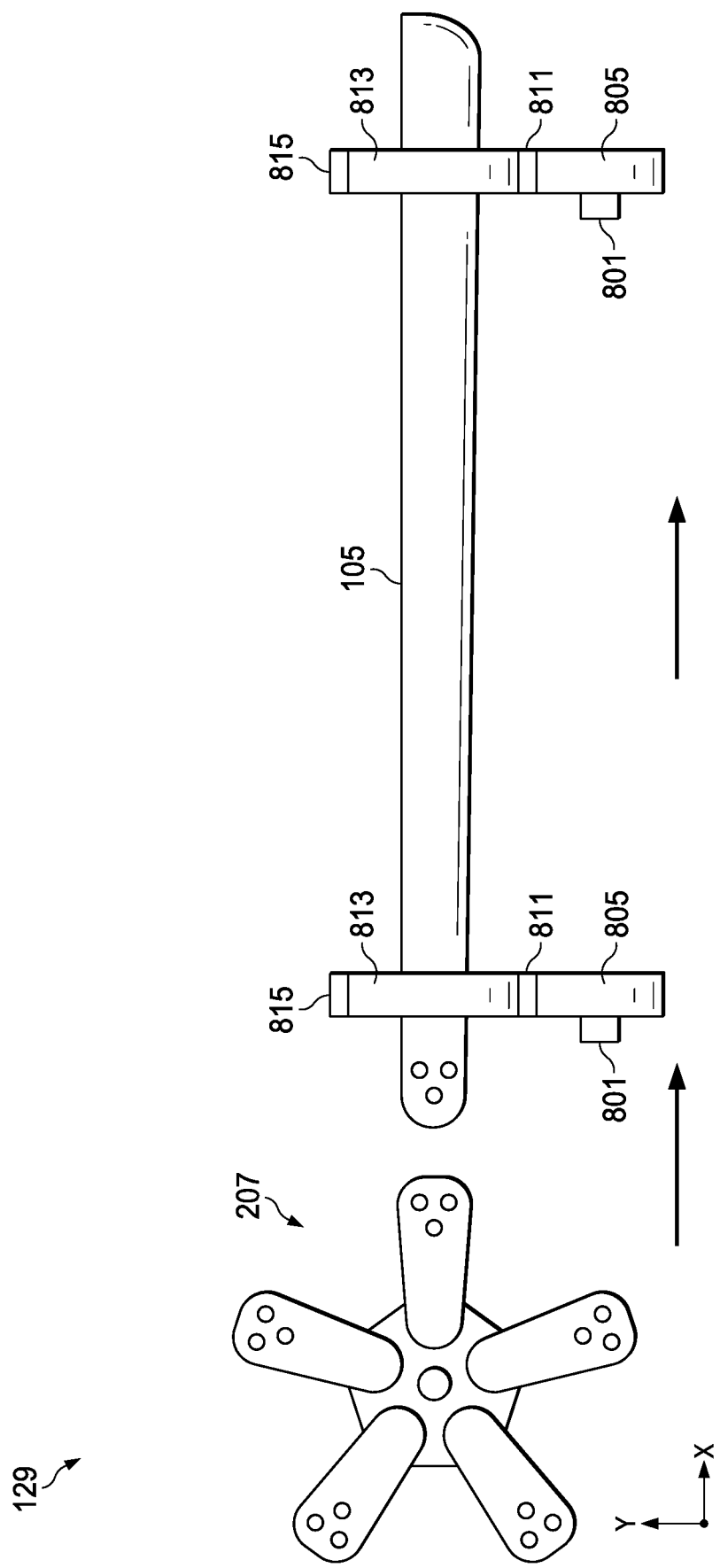

SYSTEM AND METHOD FOR ROTORCRAFT BLADE STORAGE

TECHNICAL FIELD

The present invention relates generally to rotorcraft, and, in particular embodiments, to a system and method for rotorcraft blade storage.

BACKGROUND

A rotorcraft may include one or more rotor systems including one or more main rotor systems. A main rotor system generates aerodynamic lift to support the weight of the rotorcraft in flight, and thrust to move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

In accordance with an embodiment, a device includes: a first pillar including: a bottom portion having an opening; a top portion coupled to the bottom portion by a middle portion, the top portion including a plurality of shelves stacked along a common axis intersecting the bottom portion, each of the shelves having a respective recess; a plurality of clamps, each of the shelves having a respective clamp of the clamps, where each respective clamp and respective recess of the shelves forms an airfoil cross-sectional shape; and a plurality of locks, each of the shelves having a respective lock of the locks, where each of the locks has a first locking portion on respective shelves and a second locking portion on respective clamps of the shelves.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A through 5C show a rotor blade storage rack, according to an embodiment;

FIGS. 8A through 8C show a rotor blade storage rack, according to an embodiment;

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A system and method for rotorcraft blade storage is provided, according to some embodiments. In particular, the main rotor blades may be removed from the rotorcraft and stored in a rotor blade storage rack that is attached to the rotorcraft. The blade storage rack is detachable. Storing the rotor blades using a storage rack on the rotorcraft allows the main rotor blades to be stored in the same space as the rotorcraft. The rotor blades of a rotorcraft may be fragile and heavy. The storage rack includes clamps and soft material for holding the rotor blades, which protects them during storage and transportation. Further, when the rotorcraft is transported, use of the rotor blade storage rack allows the main rotor blades to be transported on the same vehicle as the rotorcraft. Remove the main rotor blades and storing them with the rotorcraft may also allow the main rotor blades to be stored without undue stress being exerted on components of the rotor system, which are flight-critical components.

Figure 1:
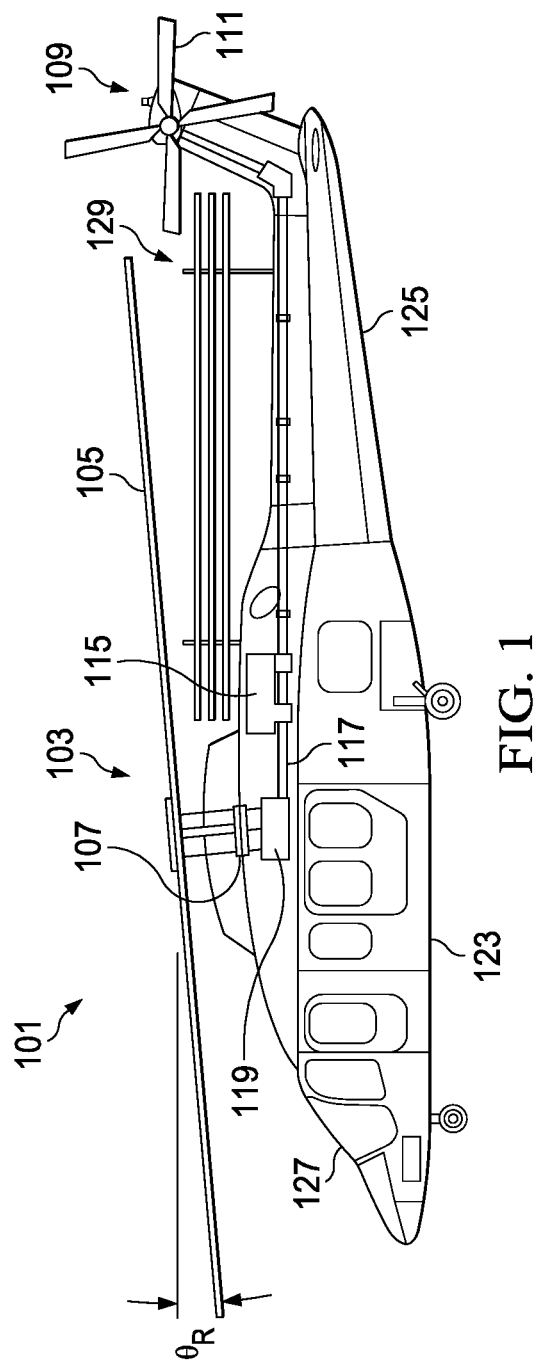
FIG. 1 illustrates a rotorcraft, according to an embodiment.

FIG. 1 illustrates a rotorcraft 101, according to an embodiment. The rotorcraft 101 has a main rotor system 103, which includes a plurality of main rotor blades 105. The main rotor system 103 has a longitudinal tilt OR with respect to a longitudinal axis of the rotorcraft 101. In an embodiment, the longitudinal tilt OR is about 5 degrees. The longitudinal tilt OR allows the rotorcraft 101 to remain relatively level when the rotorcraft 101 is moving forward in a longitudinal direction.

The pitch of each main rotor blade 105 may be controlled by a swashplate 107 in order to selectively control the attitude, altitude, and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, a fly-by-wire (FBW) control system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engines 115 is provided to a driveshaft 117, which is mechanically and operatively coupled to the main rotor system 103 and the anti-torque system through a main rotor transmission 119 and a tail rotor transmission, respectively.

The rotorcraft 101 further includes a fuselage 123 and a tail section 125. The tail section 125 may have other flight control devices such as horizontal or vertical stabilizers, rudder, elevators, or other control or stabilizing surfaces that are used to control or stabilize flight of the rotorcraft 101. The fuselage 123 includes a cockpit 127, which includes displays, controls, and instruments. A rotor blade storage rack 129 may be attached to the fuselage 123 and the tail section 125. One or more of the main rotor blades 105 may be removed from the main rotor system 103 and stored on the rotor blade storage rack 129 when the rotorcraft 101 is not in use. For example, all of the main rotor blades 105 may be removed and stored in the rotor blade storage rack 129. Alternatively, some of the main rotor blades 105 may be removed and stored in the rotor blade storage rack 129, while others are attached to the rotorcraft 101. It should be appreciated that even though rotorcraft 101 is depicted as having certain illustrated features, the rotorcraft 101 may have a variety of implementation-specific configurations. For instance, in some embodiments, the cockpit 127 is configured to accommodate a pilot or a pilot and co-pilot, as illustrated. It is also contemplated, however, that rotorcraft 101 may be operated remotely, in which case the cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case the cockpit 127 could be eliminated entirely in order to save space and cost.

Figure 2:
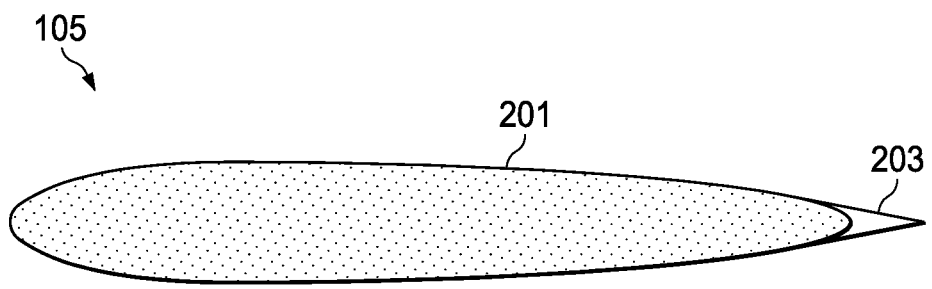
FIG. 2 illustrates a cross-sectional view of a rotor blade, according to an embodiment.

FIG. 2 illustrates a cross-sectional view of one of the main rotor blades 105, according to an embodiment. The main rotor blades 105 include a leading edge 201 and a trailing edge 203 that collectively form an airfoil cross-sectional shape. The leading edge 201 may be made of one or more composite materials, and is thicker than the trailing edge 203. The trailing edge 203 may be made from a stronger material than the leading edge 201, such as carbon tape, and may be thin. The trailing edge 203 may make up a fragile portion of the main rotor blade 105. Due to the length of the main rotor blades 105, they may be heavy. In an embodiment, each of the main rotor blades 105 weighs 175 pounds. The weight and fragility of the main rotor blades 105 may make proper and safe storage difficult. The rotor blade storage rack 129 includes features (discussed below) to protect the trailing edge 203 of the main rotor blades 105 when they are stored.

Figure 3:
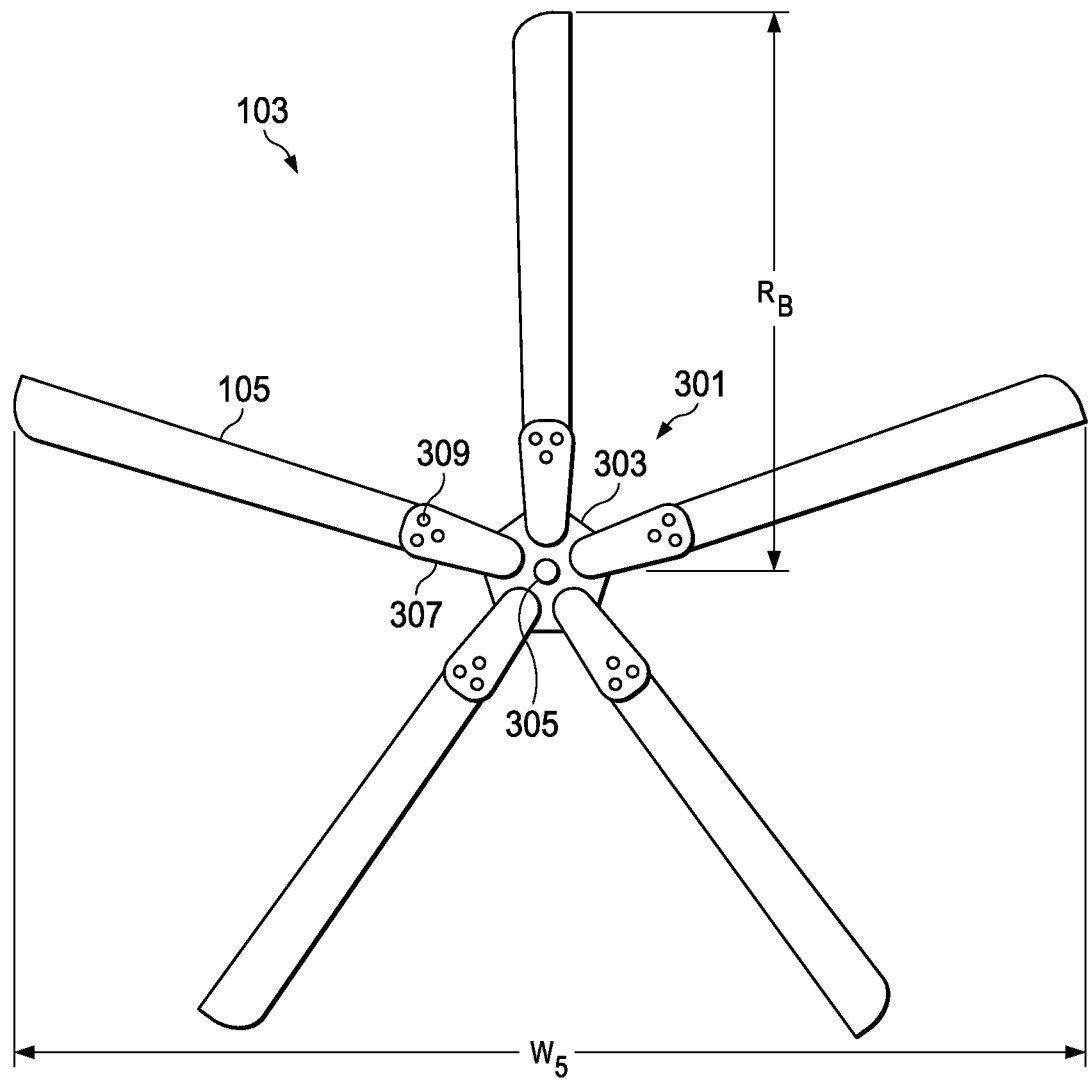
FIG. 3 illustrates a top-down view of a main rotor system, according to an embodiment.

FIG. 3 illustrates a top-down view of the main rotor system 103, according to an embodiment. A rotor hub 301 at the center of the main rotor system 103 includes a yoke 303 holding each of the main rotor blades 105. The yoke 303 is mechanically coupled to the main rotor transmission 119 through a mast 305. The main rotor transmission 119 rotates the main rotor system 103 through the mast 305 and the yoke 303 during operation. Rotor grips 307 are physically and mechanically coupled to the yoke 303. Bolts 309 secure the main rotor blades 105 to respective ones of the rotor grips 307 through bolt holes in the rotor grips 307 and the main rotor blades 105. The main rotor blades 105, the yoke 303, the rotor grips 307, and the bolts 309 are flight-critical parts. Failure of any of these parts may result in failure of the rotorcraft 101.

The main rotor system 103 may have a relatively wide wingspan. In an embodiment, the main rotor system 103 includes five main rotor blades 105 and has a radius $R_B$ of 27.25 feet. When fully assembled with all five blades, the wingspan $W_5$ of the main rotor system 103 may be relatively wide.

In rotorcraft with an even quantity of main rotor blades 105, such as four, the main rotor blades 105 may be stored by removing some of the bolts 309 and folding the rotor blades 105 about the yoke 303 to collapse them. The rotor blades 105 may be collapsed in pairs and fastened to the body of the rotorcraft 101. For example, one pair of blades may be fastened to the tail section 125 and the other pair of blades may be fastened to the cockpit 127. However, the rotorcraft 101 may have an odd quantity of main rotor blades 105, such as five. An odd quantity of blades may not fasten to the rotorcraft 101 in pairs. Further, the longitudinal tilt OR of the rotorcraft 101 and the heavy weight of the main rotor blades 105 may make folding of the main rotor blades 105 about the yoke 303 difficult. In particular, due to the longitudinal tilt OR, folding the main rotor blades 105 about the yoke 303 towards the tail section 125 requires folding the rotor blades 105 slightly upward (e.g., against gravity). This motion may result in shear stress being exerted on the bolts 309, and torsion being exerted on the main rotor blades 105 and the rotor grips 307. As noted above, these are flight-critical parts.

A system and method for rotorcraft blade storage is provided, according to some embodiments. In particular, the main rotor blades 105 may be removed from the main rotor system 103 and stored in the rotor blade storage rack 129. Storing the main rotor blades 105 in the rotor blade storage rack 129 allows the main rotor blades 105 to be stored in the same space as the rotorcraft 101. Further, when the rotorcraft 101 is transported, the rotor blade storage rack 129 allows the main rotor blades 105 to be transported on the same vehicle as the rotorcraft 101. The rotor blade storage rack 129 is detachable, and may be removed when the rotorcraft 101 is in use. Removing the main rotor blades 105 and storing them with the rotorcraft 101 may also allow the main rotor blades 105 to be stored without undue stress being exerted on the main rotor blades 105, the rotor grips 307, and/or the bolts 309.

Figure 4B:
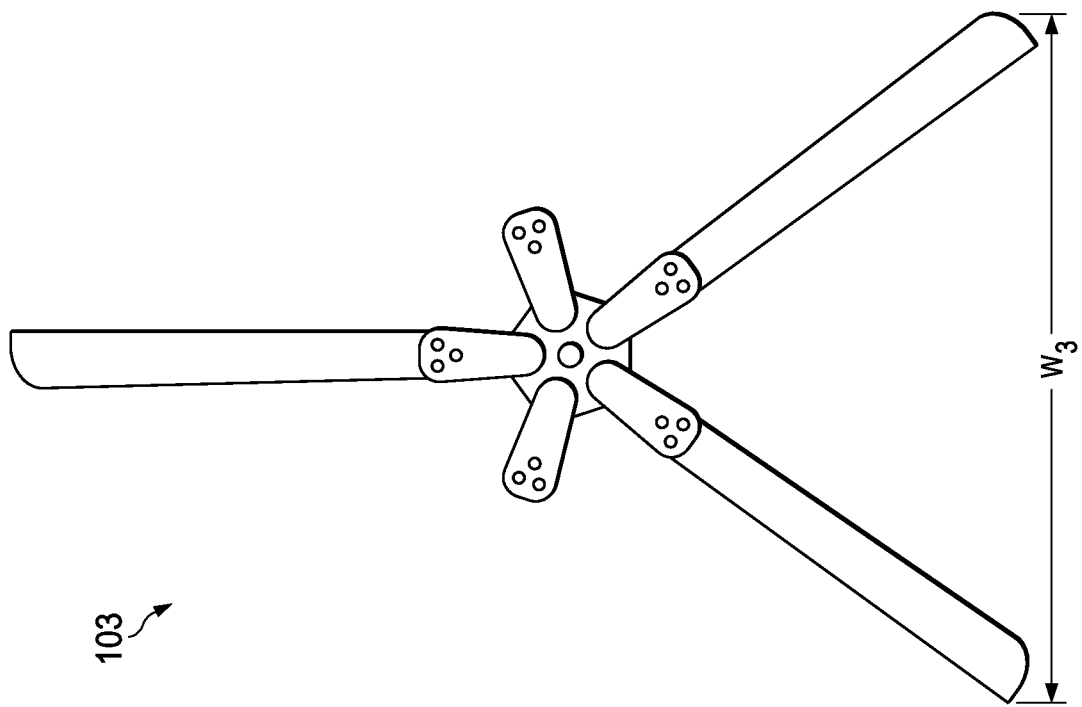
FIGS. 4A through 4D illustrate various views of the main rotor system when one or more of the main rotor blades are removed, according to an embodiment.
Figure 4A:
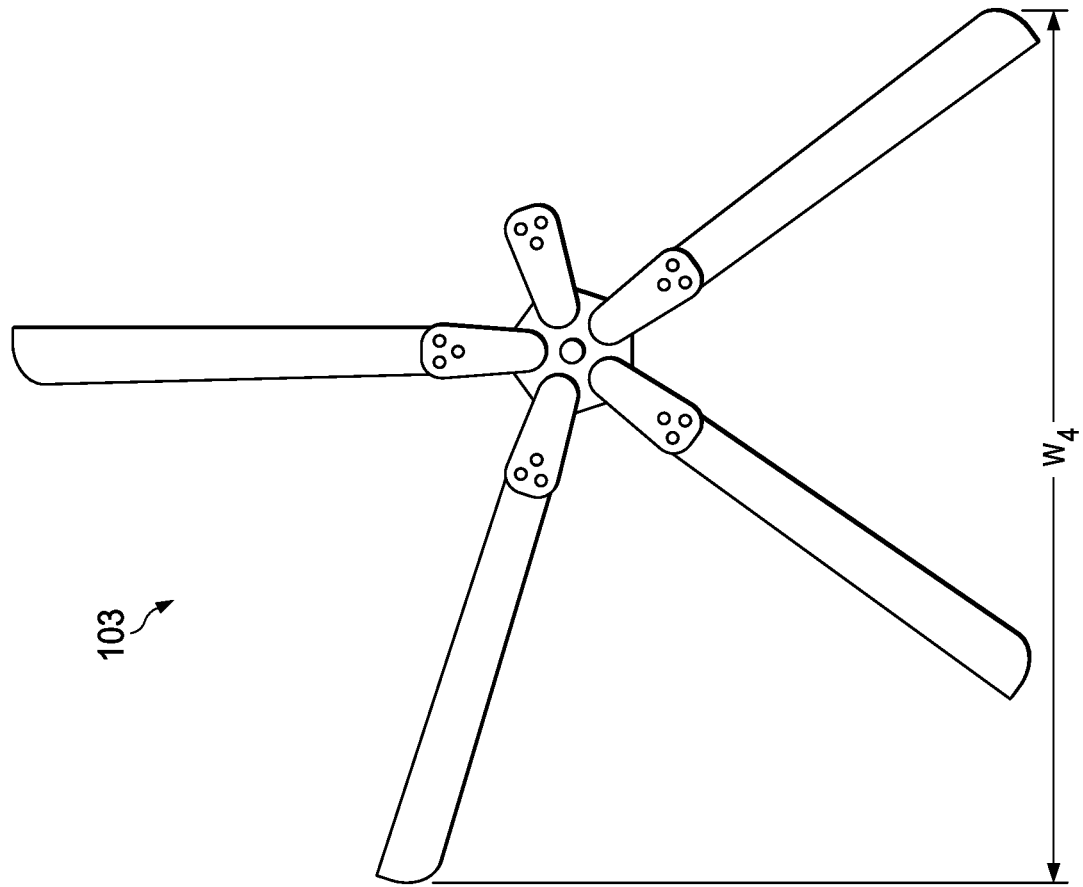
Figure 4D:
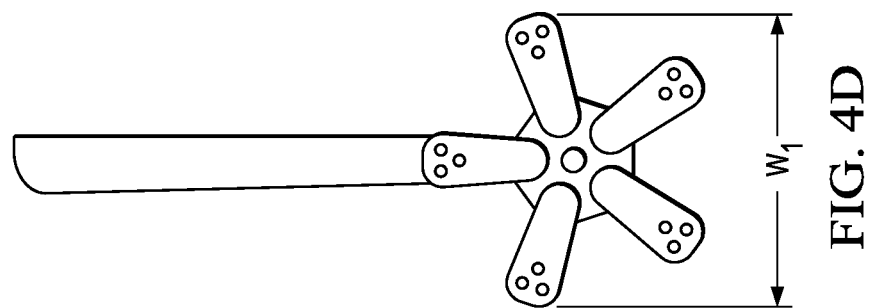
Figure 4C:
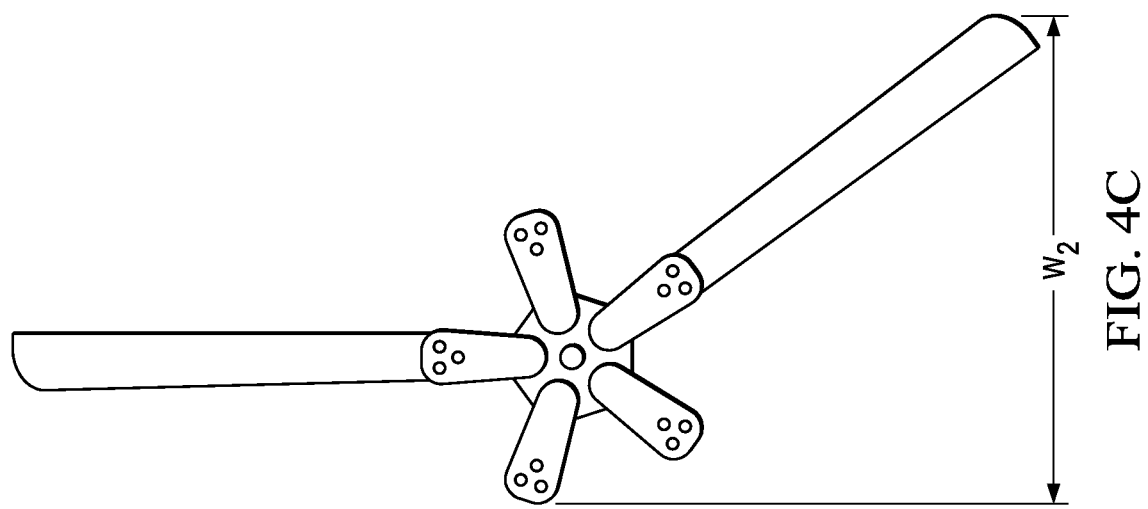

Storing the main rotor blades 105 by removing them from the main rotor system 103 allows the wingspan of the main rotor system 103 to be reduced as needed. It also allows the wingspan to be minimized without requiring all of the main rotor blades 105 be removed. FIGS. 4A through 4D illustrate various views of the main rotor system 103 when one or more of the main rotor blades 105 are removed, according to an embodiment. In FIG. 4A, one main rotor blade 105 is removed, thereby reducing the wingspan $W_4$ of the main rotor system 103 to a width less than the wingspan $W_5$. In FIG. 4B, two main rotor blades 105 are removed, thereby reducing the wingspan $W_3$ of the main rotor system 103 to a width less than the wingspan $W_4$. In FIG. 4C, three main rotor blades 105 are removed, thereby reducing the wingspan $W_2$ of the main rotor system 103 to a width less than the wingspan $W_3$. In FIG. 4D, four main rotor blades 105 are removed, thereby reducing the wingspan $W_1$ of the main rotor system 103 to a width less than the wingspan $W_2$. Notably, the wingspan $W_1$ of the main rotor system 103 with four main rotor blades 105 removed is equal to the combined width of the yoke 303 and rotor grips 307. In other words, the wingspan of the main rotor system 103 may be reduced to the wingspan $W_1$ with one main rotor blade 105 left intact. The wingspan of the rotorcraft 101 may be minimized by reducing four main rotor blades 105 and rotating the fifth blade such that it is aligned with a longitudinal axis of the rotorcraft 101. The wingspan of the rotorcraft 101 may be adjusted by removing an appropriate quantity of main rotor blades 105. For example, if space savings need to be maximized, four of the main rotor blades 105 may be removed. Conversely, if the rotorcraft 101 need only be reduced to fit in a given space, then a lesser quantity of main rotor blades 105 may be removed.

Figure 5A:
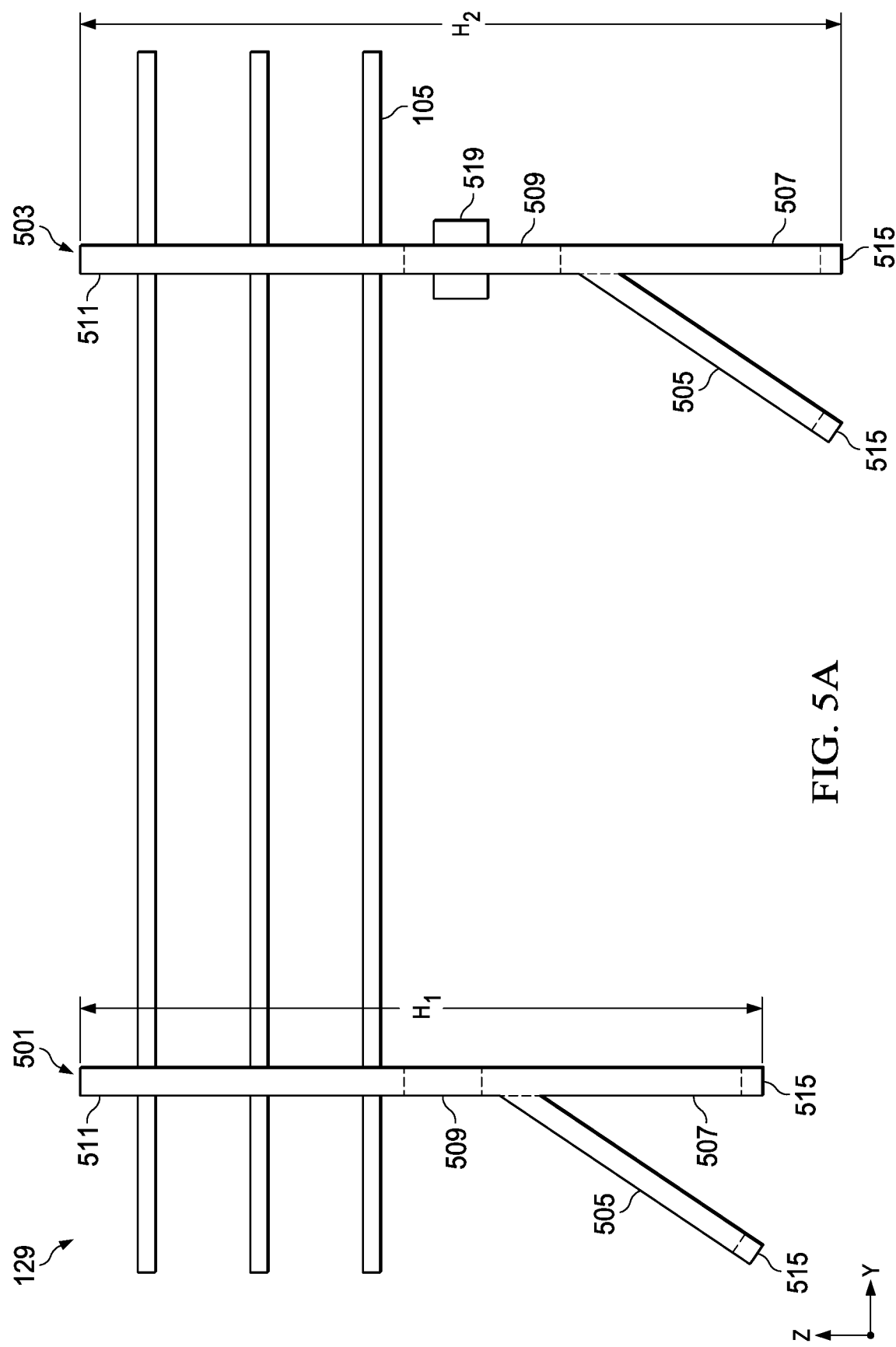
Figure 5B:
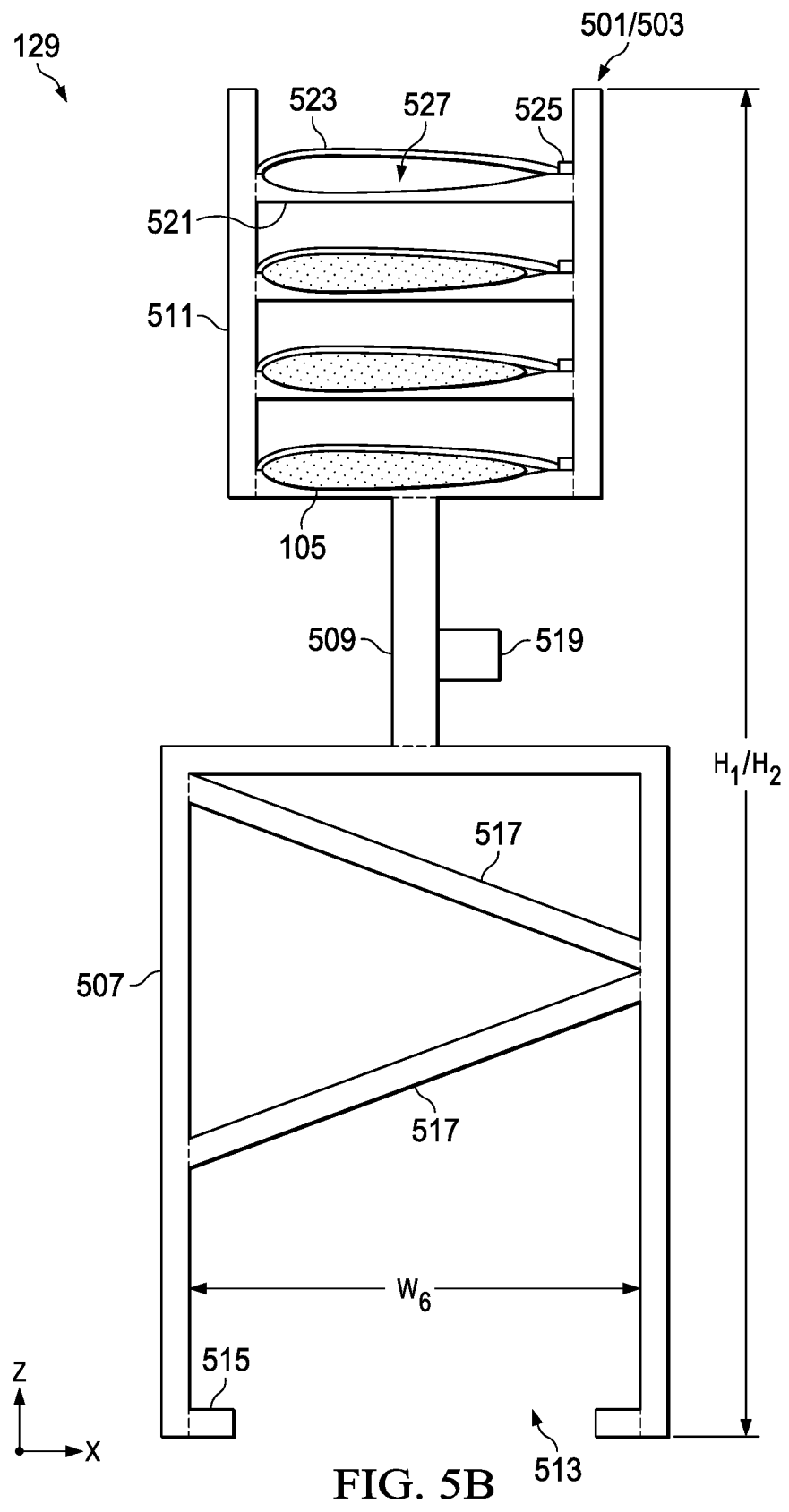

FIGS. 5A through 5C show the rotor blade storage rack 129, according to an embodiment. FIG. 5A shows a view along a latitudinal axis; FIG. 5B shows a view along a longitudinal axis; and FIG. 5C shows a top-down view. The rotor blade storage rack 129 may include a first pillar 501 and a second pillar 503, which are the main support structures for the rotor blade storage rack 129. In some embodiments, the rotor blade storage rack 129 may include more pillars. The first pillar 501 attaches to the fuselage 123, and the second pillar 503 attaches to the tail section 125. In some embodiments, the pillars may attach to other portions of the rotorcraft 101. As shown in FIG. 1, the fuselage 123 and the tail section 125 may not be level. As such, the height $H_1$ of the first pillar 501 and the height $H_2$ of the second pillar 503 may be different. In an embodiment, the height $H_1$ is less than the height $H_2$. The main rotor blades 105 are stored by fastening them to the first pillar 501 and the second pillar 503.

The first pillar 501 and the second pillar 503 each include a side brace 505, a bottom portion 507, a middle portion 509, and a top portion 511. The side brace 505 and the bottom portion 507 have an opening 513 with a width $W_6$ that is wide enough to accommodate the width of the fuselage 123 and the tail section 125, respectively. The side brace 505 has a first end attached to the bottom portion 507, and extends away from the bottom portion 507 in a diagonal direction. The side brace 505 and the bottom portion 507 each have fasteners 515 that attach the side brace 505 and the bottom portion 507, respectively, to the fuselage 123 and the tail section 125. In an embodiment, the fasteners 515 are protrusions or pins that are inserted into respective holes in the fuselage 123 and the tail section 125. In the embodiment shown in FIGS. 5A through 5C, the fasteners 515 bear the weight of the first pillar 501 and second pillar 503. The bottom portion 507 includes a first vertical beam, a second vertical beam, and a horizontal beam that attach end-to-end to form the opening 513. The bottom portion 507 includes trusses 517 that support the bottom portion 507 and prevent the opening 513 from collapsing. The trusses 517 extend from the first vertical beam to the second vertical beam. In an embodiment each of the first and second vertical beams have a first end and a second end. The first and second ends are coupled to the horizontal beam and the respective side braces 505; the second ends are coupled to the fasteners 515. The first and second vertical beams each form an acute angle with respective side braces 505.

The middle portion 509 couples the bottom portion 507 to the top portion 511. A container 519 is attached to the middle portion 509 of the second pillar 503, and is used to hold the bolts 309 for the main rotor blades 105 stored on the rotor blade storage rack 129. Storing the bolts 309 with the main rotor blades 105 helps avoid loss of the bolts 309 when they are not attached to the rotorcraft 101. In some embodiments, the middle portion 509 is omitted, and the top portion 111 is directly connected to the bottom portion 507.

The top portion 511 includes shelves 521 that hold the main rotor blades 105. The shelves 521 are aligned along a common axis of each pillar. The shelves 521 have clamps 523 that secure the main rotor blades 105. The clamps 523 are fastened shut with locks 525. The shelves 521 have recesses 527 such that, when the clamps 523 are closed and fastened, the recesses 527 and the clamps 523 form an opening in the shape of the main rotor blades 105. That is, the openings may have an airfoil cross-sectional shape. In some embodiments, the recesses 527 form the bottom of the airfoil shape, and the clamps 523 form the top of the airfoil shape. As such, when the main rotor blades 105 are fastened to the shelves 521 with the clamps 523, there are substantially no gaps around the main rotor blades 105. The airfoil shapes of the first pillar 501 and the second pillar 503 align along the longitudinal axis of the rotorcraft 101 when the rotor blade storage rack 129 is attached to the rotorcraft 101.

The shelves 521 are removable, and may be fastened to the side braces of the top portion 511 with bolts, clips, or the like. In an embodiment, the side braces and sides of the shelves 521 have openings for bolts, which extend through the openings and secure the shelves 521 in a vertical direction.

The shelves 521 and clamps 523 may be covered with a conformal or soft material (shown below), such as foam. The soft material may conform to the airfoil shape of the main rotor blades 105, and form a tight seal around the main rotor blades 105 in the openings such that the main rotor blades 105 are protected and securely held. In particular, tightly forming the soft material around the main rotor blades 105 may protect the fragile trailing edge 203. In some embodiments, the clamps 523 may not have an airfoil shape, and may have another shape such as a square, oval, etc. The soft material on the clamps 523 may form the opening in the airfoil shape.

The clamps 523 may be formed of several types of material. In some embodiments, the clamps 523 are rigid, and maintain their shape. As such, the clamps 523 may maintain their half of the airfoil cross-sectional shape even when they are not fastened with the locks 525. In such embodiments, the clamps 523 may be formed of metal, plastic, a composite material, and the like. In some embodiments, the clamps 523 are straps, and may not maintain their shape. In such embodiments, the clamps 523 may be formed of cloth, or other deformable material.

The clamps 523 may attach to the shelves 521 in several manners. In some embodiments, hinges (not shown) attach the clamps 523 to the shelves 521. The hinges may be on an opposite side of the shelves as the locks 525. In some embodiments, the clamps 523 may be removable, and a plurality of locks 525 for each shelf 521 may fasten the clamps 523 to the shelves 521.

The locks 525 may include several portions. In an embodiment, the locks 525 include a first locking portion on the clamps 523, and a second locking portion on the shelves 521. The locking portions may be, e.g., holes that a pin, shackle, or the like is inserted into. In some embodiments, the locks 525 may be latches or the like that secure the clamps 523 to the shelves 521.

Although the first pillar 501 and the second pillar 503 are shown are having discrete sections (with dotted lines), it should be appreciated that the side brace 505, bottom portion 507, middle portion 509, and top portion 511 may all be formed of a same material. The material may be a metal, a composite material, or the like.

Figure 6A:
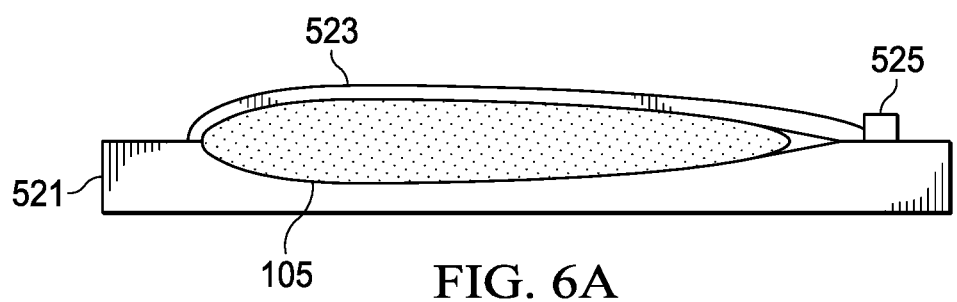
FIGS. 6A and 6B are detailed views of a shelf of the rotor blade storage rack, according to an embodiment.
Figure 6B:
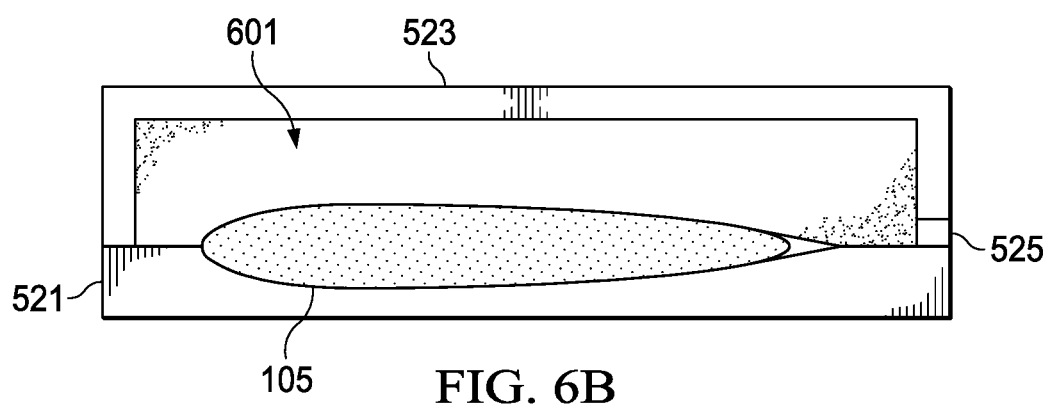

FIGS. 6A and 6B are detailed views of a shelf 521 holding a main rotor blade 105, according to an embodiment. The clamps 523 extend over the main rotor blades 105 along the longitudinal axis of the airfoil cross-sectional shape. In the embodiment shown in FIG. 6A, the clamps 523 have an airfoil shape, and conform to the shape of the main rotor blade 105. As such, a small amount of soft material, or no soft material, may be used. In the embodiment shown in FIG. 6B, the clamps 523 may not conform directly to the shape of the main rotor blade 105 themselves, and may be a square frame on which a conformal material 601 such as foam, rubber, or the like is disposed on. As such, the conformal material 601 conforms to the shape of the main rotor blade 105 and the clamps 523. It should be appreciated that the clamps 523 may have many shapes. The clamps 523, the soft material 601, or both may conform to the shape of the main rotor blades 105.

Figure 7:
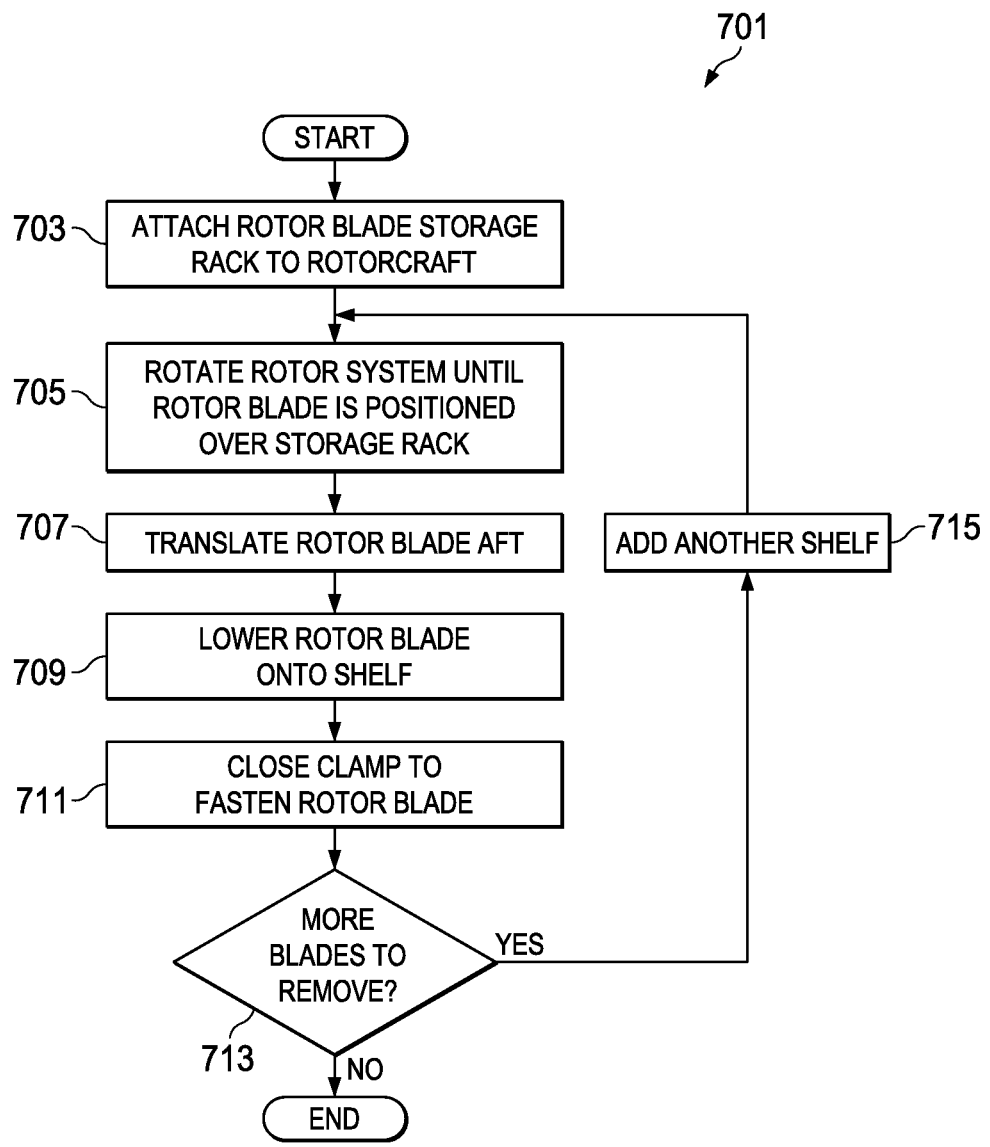
FIG. 7 is a flow diagram illustrating a method for using the rotor blade storage rack, according to an embodiment.

FIG. 7 is a flow diagram illustrating a method 701 for using the rotor blade storage rack 129 shown in FIGS. 5A through 5C. The first pillar 501 and the second pillar 503 are attached to the rotorcraft 101 (step 703). The first pillar 501 is positioned over the fuselage 123, and the fasteners 515 of the side brace 505 and the bottom portion 507 are inserted into holes on the sides of the fuselage 123. The second pillar 503 is positioned over the tail section 125, and the fasteners 515 of the side brace 505 and the bottom portion 507 are inserted into holes on the sides of the tail section 125. The main rotor system 103 is rotated until a main rotor blade 105 is positioned over the rotor blade storage rack 129 (step 705). The main rotor blade 105 is translated aft, e.g., towards the tail rotor 109 (step 707). Translating aft may include removing the bolts 309 for the main rotor blade 105, and removing the main rotor blade 105 from the rotor hub 301. The bolts 309 may optionally be stored in the container 519. The main rotor blade 105 is vertically lowered onto an open shelf 521 of the rotor blade storage rack 129 (step 709). Vertically lowering the main rotor blade 105 may include using a crane to lower the main rotor blade 105, which as noted above, may be heavy. The clamp 523 for the shelf 521 is closed around the main rotor blade 105 (step 711). The lock 525 is used to secure the clamp 523 such that it securely holds the main rotor blade 105 and protects the trailing edge 203. If more main rotor blades 105 are desired to be removed (step 713), then another shelf 521 may be added to the rotor blade storage rack 129 (step 715), and the method 701 may be repeated starting from step 705. The new shelf 521 provides a place for the next main rotor blades 105 to be lowered onto the rotor blade storage rack 129. More blades may be removed to further shrink the footprint of the rotorcraft 101. The method 701 concludes after all desired main rotor blades 105 are removed.

Figure 8A:
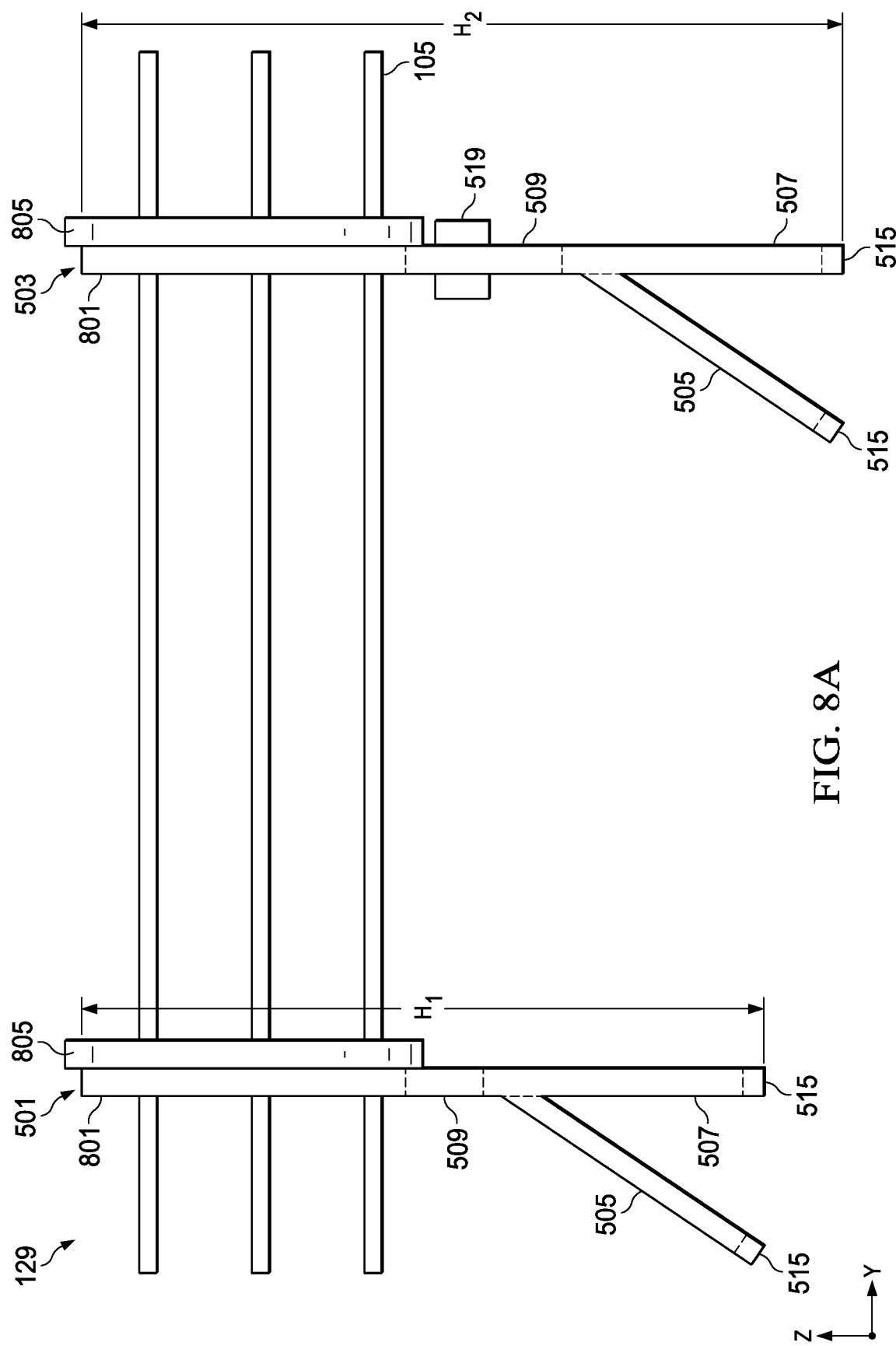
Figure 8B:
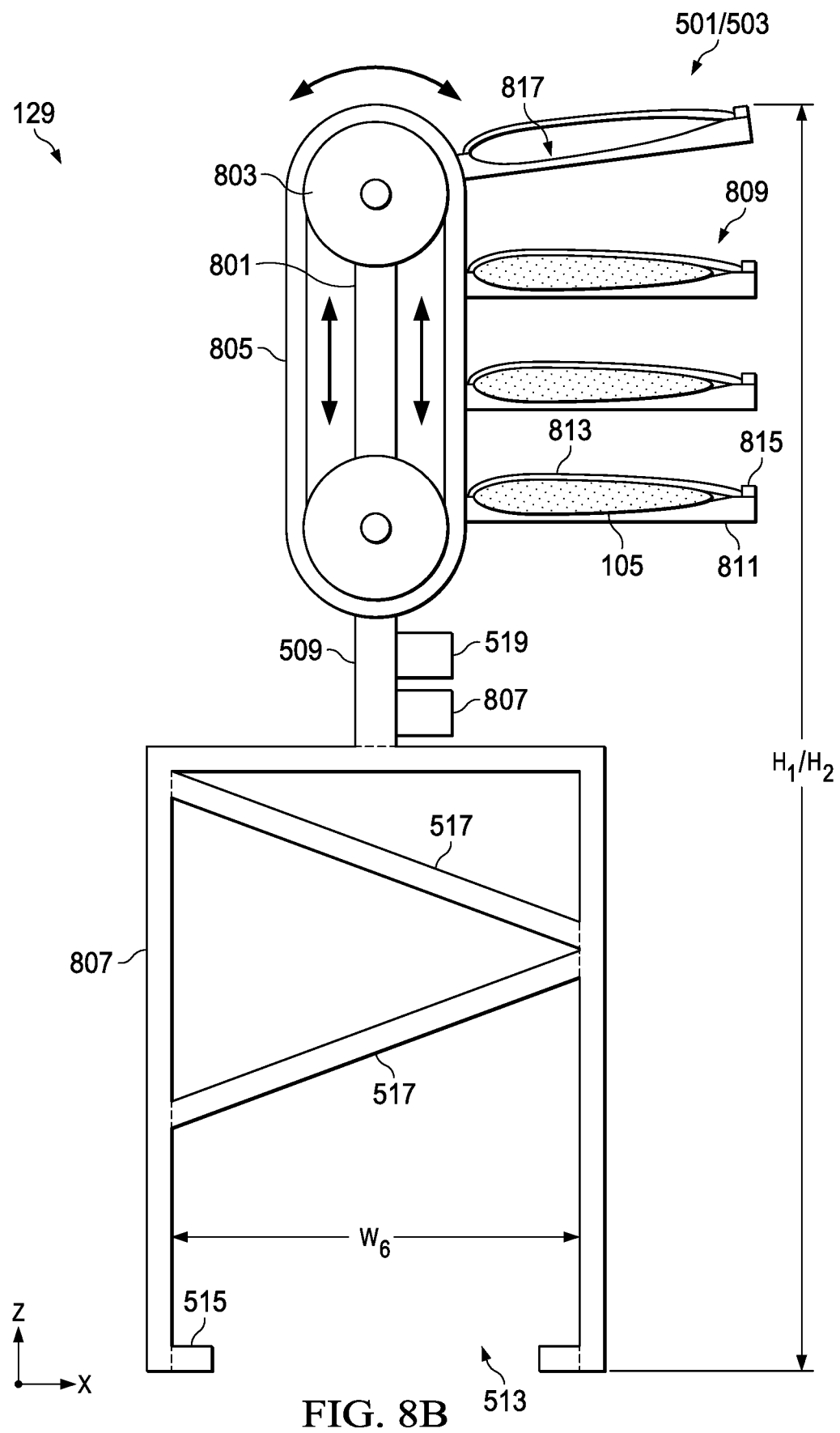

FIGS. 8A through 8C show the rotor blade storage rack 129, according to another embodiment. FIG. 8A shows a view along a latitudinal axis; FIG. 8B shows a view along a longitudinal axis; and FIG. 8C shows a top-down view. The rotor blade storage rack 129 shown in FIGS. 8A through 8C stores the main rotor blades 105 on an elevator system that vertically raises and lowers the main rotor blades 105 during installation and removal.

The first pillar 501 and the second pillar 503 include a blade elevator 801 in some embodiments. The blade elevator 801 includes pulleys 803 and a belt 805 that together form a blade elevator system. The pulleys 803 are driven by one or more motors 807 attached to the middle portion 509. The motors 807 are operable to turn the pulleys 803 such that the belt 805 raises and lower in the direction of the motion arrows. The rotor blade platforms 809 may be positioned on a first side of the blade elevator 801 when empty. The motors 807 drive the pulleys 803 such that the rotor blade platforms 809 are rotated from the first side of the blade elevator 801 (e.g., the left-hand side in FIG. 8B), over the top pulley 803, and to a second side of the blade elevator 801 (e.g., the right-hand side in FIG. 8B).

Rotor blade platforms 809 are attached to the belt 805. The rotor blade platforms 809 include shelves 811 that hold the main rotor blades 105. The shelves 811 have clamps 813 that secure the main rotor blades 105. The clamps 813 are fastened shut with locks 815. The shelves 811 have recesses 817 such that, when the clamps 813 are closed and fastened, the recesses 817 and the clamps 813 form an opening in the shape of the main rotor blades 105. That is, the openings have an airfoil cross-sectional shape. As such, when the main rotor blades 105 are fastened to the shelves 811 with the clamps 813, there are substantially no gaps around the main rotor blades 105. The shelves 811 and clamps 813 may be covered with a soft material, such as foam. The soft material may form a tight seal around the main rotor blades 105 in the openings such that the main rotor blades 105 are protected and securely held. The trailing edge 203 may be protected by the soft material and the airfoil shape of the openings.

Figure 9:
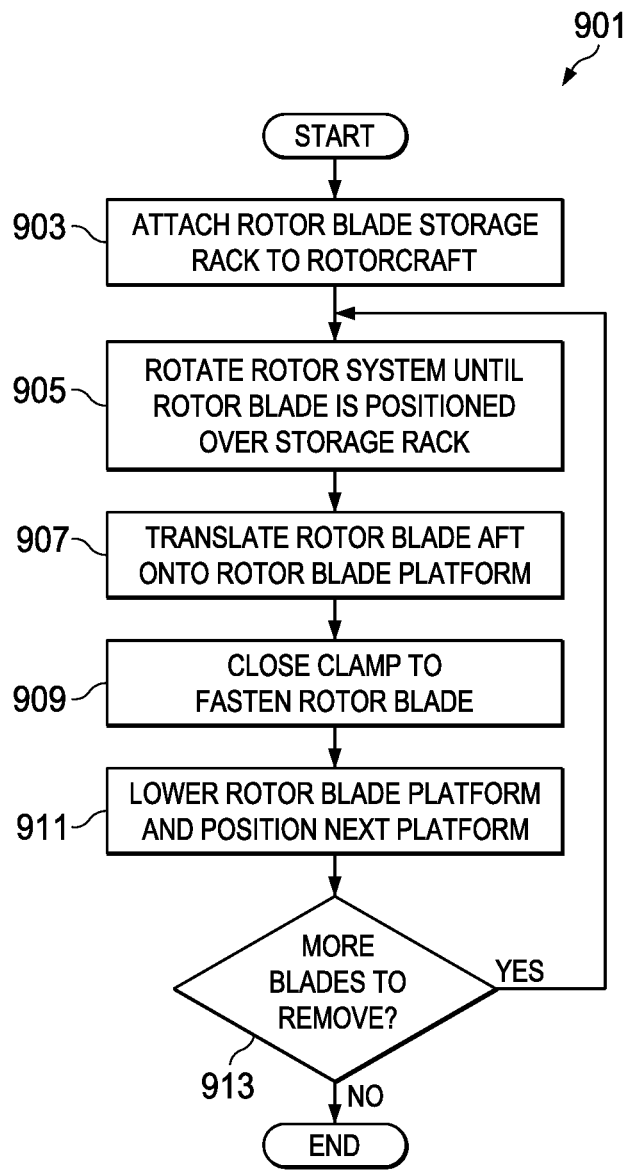
FIG. 9 is a flow diagram illustrating a method for using the rotor blade storage rack, according to an embodiment.

FIG. 9 is a flow diagram illustrating a method 901 for using the rotor blade storage rack 129 shown in FIGS. 8A through 8C. The first pillar 501 and the second pillar 503 are attached to the rotorcraft 101 (step 903). The main rotor system 103 is rotated until a main rotor blade 105 is positioned over the rotor blade storage rack 129 (step 905). The main rotor blade 105 is translated aft and onto the first rotor blade platform 709 (step 907). The clamp 713 for the first rotor blade platform 709 is closed around the main rotor blade 105 (step 909). The first rotor blade platform 709 is lowered and the next rotor blade platform 709 is positioned to receive the next main rotor blade 105 (step 911). The motors 807 are used to drive the pulleys 703 which move the belt 705, thereby simultaneously lowering the first rotor blade platform 709 and positioning the next rotor blade platform 709. If more main rotor blades 105 are desired to be removed (step 913), the method 901 may be repeated starting from step 905.

Figure 10:
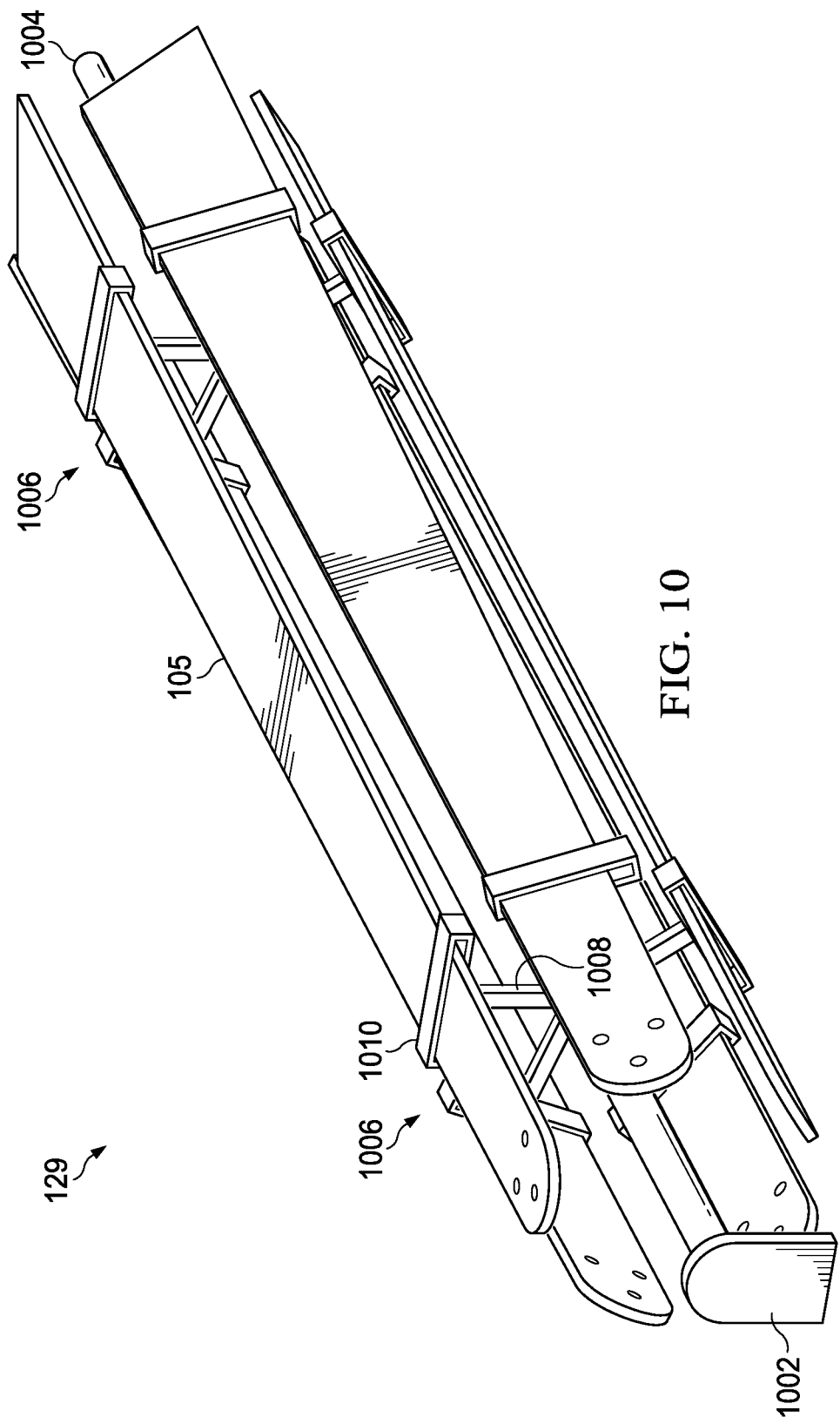
FIG. 10 shows a rotor blade storage rack, according to an embodiment

FIG. 10 shows a three-dimensional view of the rotor blade storage rack 129, according to another embodiment. In the embodiment shown in FIG. 10, the rotor blade storage rack 129 includes supports 1002 and a shaft 1004 connecting the supports 1002. The supports 1002 are the main support structures for the rotor blade storage rack 129. The supports 1002 attach to the fuselage 123 and the tail section 125. Although only one support 1002 is illustrated, it should be appreciated that another support 1002 is fastened at the opposing end of the shaft 1004. The shaft 1004 may be formed of metal such that it has sufficient strength to bear the weight of the main rotor blades 105. The supports 1002 may each have a bottom portion (not shown) similar to the bottom portion 507, and may attach to the rotorcraft 101 with fasteners 515 on a side brace 505.

Blade racks 1006 are attached to the shaft 1004. The shaft 1004 extends through opening in the centers of the blade racks 1006. The blade racks 1006 rotate around the shafts 1004, and may include bearings (not shown) so that they rotate easily. The blade racks 1006 include a plurality of arms 1008, and the main rotor blades 105 are mounted to the arms 1008 using fasteners 1010. The quantity of arms 1008 may be the same as the quantity of main rotor blades 105 on the rotorcraft 101. For example, in embodiments where the rotorcraft 101 has five blades, the blade racks 1006 may have five arms 1008.

The fasteners 1010 are used to attach the main rotor blades 105 to the ends of the arms 1008 may be similar to the clamps 523 shown in FIGS. 6A and 6B. For example, the fasteners 1010 may be metal, plastic, or composite clamps, or may be straps. The fasteners 1010 may be formed of a rigid or deformable material, and may have soft material to conform to the shape of the main rotor blades 105. The openings in the fasteners 1010 may have an airfoil shape to accommodate the main rotor blades 105, and be closed shut with locks that are similar to the locks 525.

Figure 11:
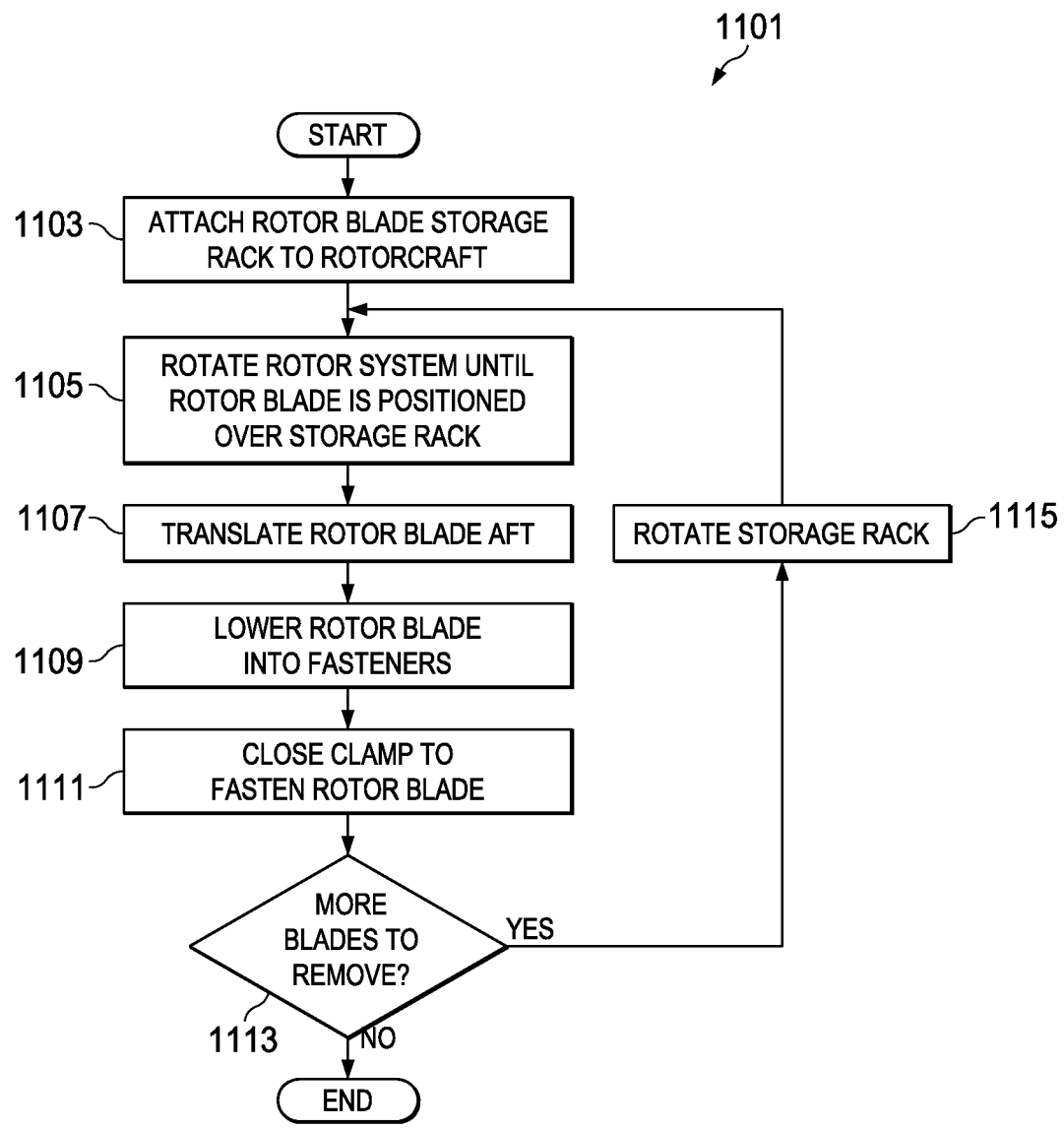
FIG. 11 is a flow diagram illustrating a method for using the rotor blade storage rack, according to an embodiment.

FIG. 11 is a flow diagram illustrating a method 1101 for using the rotor blade storage rack 129 shown in FIG. 10. The supports 1002 are attached to the rotorcraft 101 (step 1103). A first supports 1002 is positioned over the fuselage 123, and a second support 1002 is positioned over the tail section 125. The main rotor system 103 is rotated until a main rotor blade 105 is positioned over the rotor blade storage rack 129 (step 1105). The main rotor blade 105 is translated aft, e.g., towards the tail rotor 109 (step 1107). Translating aft may include removing the bolts 309 for the main rotor blade 105, and removing the main rotor blade 105 from the rotor hub 301. The main rotor blade 105 is vertically lowered onto an open set of fasteners 1010 on the arms 1008 (step 1109). Vertically lowering the main rotor blade 105 may include using a crane to lower the main rotor blade 105, which as noted above, may be heavy. The clamps for the fasteners are closed around the main rotor blade 105 (step 1111). The locks are used to secure the clamps such that they securely hold the main rotor blades 105 and protects the trailing edges 203. If more main rotor blades 105 are desired to be removed (step 1113), then the rotor blade storage rack 129 may be rotated until a free set of fasteners 1010 and arms 1008 are facing upward (towards the main rotor system 103), and the method 1101 may be repeated starting from step 1105. More blades may be removed to further shrink the footprint of the rotorcraft 101. The method 1101 concludes after all desired main rotor blades 105 are removed.

Figure 12:
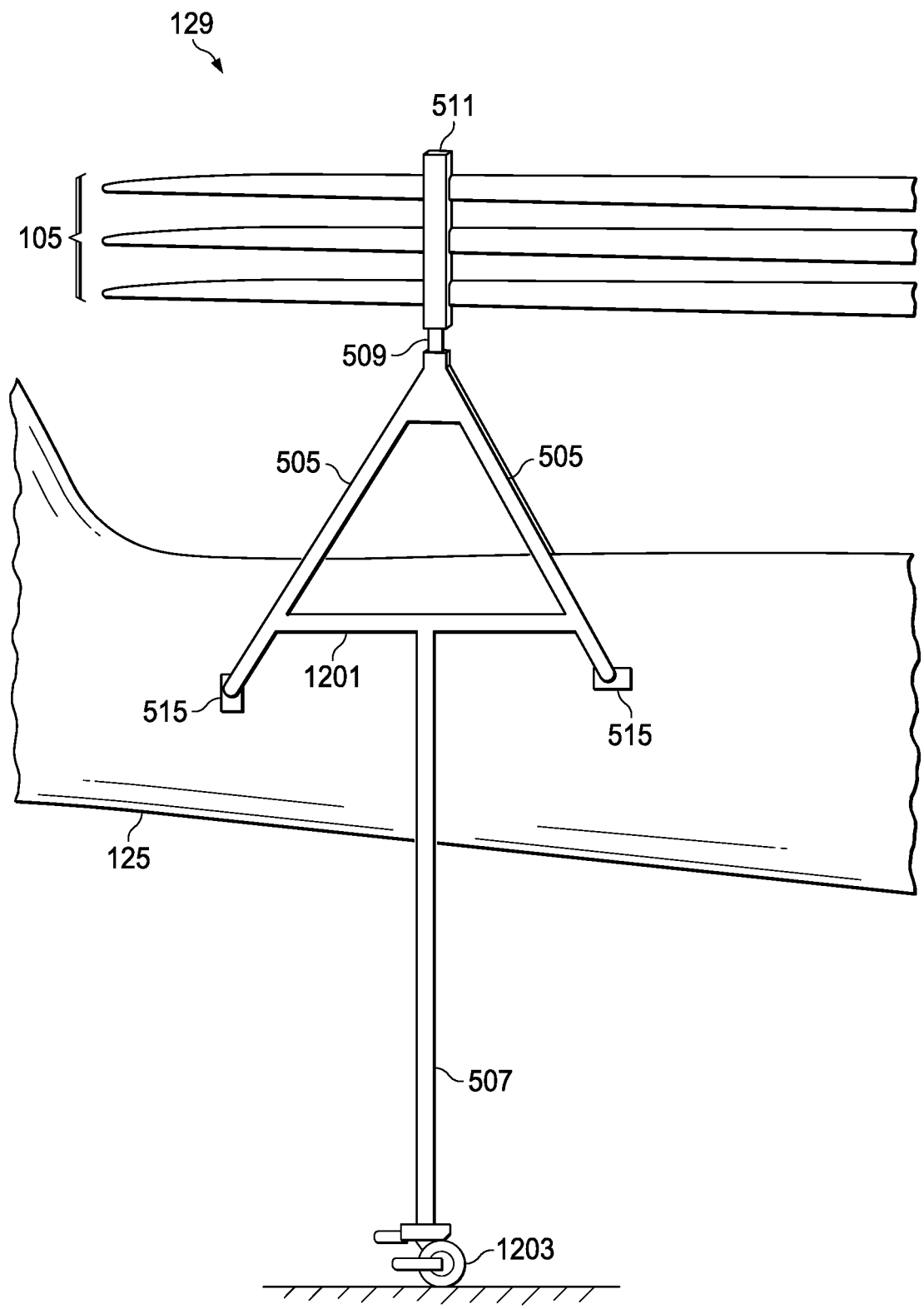
FIG. 12 shows a rotor blade storage rack, according to an embodiment.

FIG. 12 shows a side view of the rotor blade storage rack 129, according to another embodiment. The embodiment shown in FIG. 12 is similar to the embodiment shown in FIGS. 5A through 5C, except the storage rack 129 includes two side braces 505 connected by a support beam 1201. The two side braces 505 and the support beam 1201 are arranged to form a triangle. The bottom portion 507 includes a vertical beam of sufficient length to extend to the ground. The vertical beam is supported from the ground by a supporting wheel 1203, such as a caster wheel, although it should be appreciated that any type of mobile or stationary device could support the bottom portion 507 from the ground. In some embodiments, only some of the pillars are supported from the ground. For example, the second pillar 503 (e.g., attached to the tail section 125) may have a vertical beam extending to the ground, and the first pillar 501 may be attached to the fuselage 123. In such embodiments, the second pillar 503 is substantially supported by the ground, and the side braces 505 fastening the second pillar 503 to the fuselage 123 laterally stabilize the second pillar 503.

Embodiments may achieve advantages. Storing the main rotor blades 105 with the rotorcraft 101 may save storage and transportation costs. Removing the main rotor blades 105 for storage may reduce strain on flight-critical parts of the main rotor system 103. Removing the rotor blade storage rack 129 when not in use may reduce the weight of the rotorcraft 101.

In accordance with an embodiment, a device includes: a first pillar including: a bottom portion having an opening; a top portion coupled to the bottom portion by a middle portion, the top portion including a plurality of shelves stacked along a common axis intersecting the bottom portion, each of the shelves having a respective recess; a plurality of clamps, each of the shelves having a respective clamp of the clamps, where each respective clamp and respective recess of the shelves forms an airfoil cross-sectional shape; and a plurality of locks, each of the shelves having a respective lock of the locks, where each of the locks has a first locking portion on respective shelves and a second locking portion on respective clamps of the shelves.

In some embodiments, the device further includes a second pillar. In some embodiments, the second pillar is taller than the first pillar. In some embodiments, the clamps are straps. In some embodiments, the clamps each include: a frame; and a conformal material on the frame, the conformal material forming, in use, a portion of the airfoil cross-sectional shape. In some embodiments, the clamps connect to the shelves on a first side and a second side, and the clamps extend from the first side to the second side along a longitudinal axis of the airfoil cross-sectional shape. In some embodiments, the device further includes a first fastener and a second fastener connected to the bottom portion. In some embodiments, the first fastener and the second fastener are pins. In some embodiments, the opening extends between the first fastener and the second fastener. In some embodiments, the top portion further includes a vertical beam coupled to a first side of each of the shelves. In some embodiments, the top portion further includes: a belt coupled to first side of each of the shelves; a plurality of pulleys coupled to the belt; and a motor configured to drive the pulleys. In some embodiments, the middle portion includes: a vertical beam coupled to the bottom portion and the top portion; and a container coupled to the vertical beam. In some embodiments, the first pillar further includes: a side brace coupled to the bottom portion, the side brace and the bottom portion forming an acute angle. In some embodiments, the first pillar further includes: a supporting wheel attached to the bottom portion.

In accordance with an embodiment, a system includes: a first pillar configured to be coupled to a tail section of a rotorcraft, the first pillar having a first shelf over the tail section, a first clamp fastened to the first shelf, the first shelf and the first clamp forming an airfoil cross-sectional shape; and a second pillar configured to be coupled to a fuselage of the rotorcraft, the second pillar having a second shelf over the fuselage, a second clamp fastened to the second shelf the second shelf and the second clamp forming the airfoil cross-sectional shape, where the airfoil cross-sectional shape of the first shelf and the first clamp is aligned with the airfoil cross-sectional shape of the second shelf and the second clamp along a longitudinal axis of the rotorcraft in use.

In some embodiments, the second pillar is taller than the first pillar. In some embodiments, the first shelf is coupled to a first vertical beam, and the second shelf is coupled to a second vertical beam. In some embodiments, the first shelf is coupled to a first blade elevator, and the second shelf is coupled to a second blade elevator. In some embodiments, the first shelf is one of a plurality of first shelves extending along a first common axis intersecting the tail section, and the second shelf is one of a plurality of second shelves extending along a second common axis intersecting the fuselage. In some embodiments, the first common axis and the second common axis are parallel.

In accordance with an embodiment, a method includes: attaching a first pillar of a rotor blade storage rack to a tail section of a rotorcraft, and a second pillar of the rotor blade storage rack to a fuselage of the rotorcraft, the first and the second pillar each having a plurality of shelves; rotating a main rotor system of the rotorcraft until a first rotor blade of the main rotor system is positioned over the rotor blade storage rack; translating the first rotor blade towards the tail section; and lowering the first rotor blade onto a first shelf of the shelves of the first and the second pillar.

In some embodiments, the method further includes fastening the first rotor blade to the first shelf with a first clamp. In some embodiments, the method further includes locking the first clamp with a lock coupled to the first shelf and the first clamp.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft blade storage device comprising: a first pillar comprising: a bottom portion having an opening; a top portion coupled to the bottom portion by a middle portion, the top portion comprising a plurality of shelves stacked along a common axis intersecting the bottom portion, each of the shelves having a respective recess; a plurality of clamps, each of the shelves having a respective clamp of the clamps, wherein each respective clamp and respective recess of the shelves forms an airfoil cross-sectional shape; and a plurality of locks, each of the shelves having a respective lock of the locks, wherein each of the locks has a first locking portion on respective shelves and a second locking portion on respective clamps of the shelves.

2. The device of claim 1, further comprising a second pillar.

3. The device of claim 2, wherein the second pillar is taller than the first pillar.

4. The device of claim 1, wherein the clamps are straps.

5. The device of claim 1, wherein the clamps each comprise:
   a frame; and
   a conformal material on the frame, the conformal material forming, in use, a portion of the airfoil cross-sectional shape.

6. The device of claim 1, wherein the clamps connect to the shelves on a first side and a second side, and wherein the clamps extend from the first side to the second side along a longitudinal axis of the airfoil cross-sectional shape.

7. The device of claim 1, further comprising a first fastener and a second fastener connected to the bottom portion.

8. The device of claim 7, wherein the first fastener and the second fastener are pins.

9. The device of claim 7, wherein the opening extends between the first fastener and the second fastener.

10. The device of claim 1, wherein the top portion further comprises a vertical beam coupled to a first side of each of the shelves.

11. The device of claim 1, wherein the top portion further comprises:
    a belt coupled to first side of each of the shelves;
    a plurality of pulleys coupled to the belt; and
    a motor configured to drive the pulleys.

12. The device of claim 1, wherein the middle portion comprises:
    a vertical beam coupled to the bottom portion and the top portion; and
    a container coupled to the vertical beam.

13. The device of claim 1, wherein the first pillar further comprises:
    a side brace coupled to the bottom portion, the side brace and the bottom portion forming an acute angle.

14. The device of claim 1, wherein the first pillar further comprises:
    a supporting wheel attached to the bottom portion.

15. A rotorcraft blade storage system comprising: a first pillar configured to be coupled to a tail section of a rotorcraft, the first pillar having a first shelf over the tail section, a first clamp fastened to the first shelf, the first shelf and the first clamp forming an airfoil cross-sectional shape; and a second pillar configured to be coupled to a fuselage of the rotorcraft, the second pillar having a second shelf over the fuselage, a second clamp fastened to the second shelf, the second shelf and the second clamp forming the airfoil cross-sectional shape, wherein the airfoil cross-sectional shape of the first shelf and the first clamp is aligned with the airfoil cross-sectional shape of the second shelf and the second clamp along a longitudinal axis of the rotorcraft in use.

16. The system of claim 15, wherein the second pillar is taller than the first pillar.

17. The system of claim 15, wherein the first shelf is coupled to a first vertical beam, and wherein the second shelf is coupled to a second vertical beam.

18. The system of claim 15, wherein the first shelf is coupled to a first blade elevator, and wherein the second shelf is coupled to a second blade elevator.

19. The system of claim 15, wherein the first shelf is one of a plurality of first shelves extending along a first common axis intersecting the tail section, and wherein the second shelf is one of a plurality of second shelves extending along a second common axis intersecting the fuselage.

20. The system of claim 19, wherein the first common axis and the second common axis are parallel.

21. A method of storing a rotorcraft blade comprising: attaching a first pillar of a rotor blade storage rack to a tail section of a rotorcraft, and a second pillar of the rotor blade storage rack to a fuselage of the rotorcraft, the first and the second pillar each having a plurality of shelves; rotating a main rotor system of the rotorcraft until a first rotor blade of the main rotor system is positioned over the rotor blade storage rack; translating the first rotor blade towards the tail section; and lowering the first rotor blade onto a first shelf of the shelves of the first and the second pillar.

22. The method of claim 21, further comprising fastening the first rotor blade to the first shelf with a first clamp.

23. The method of claim 22, further comprising locking the first clamp with a lock coupled to the first shelf and the first clamp.

* * * * *

UNITED STATES PATENT AND TRADEMARK OFFICE
CERTIFICATE OF CORRECTION

| | | |
|---|---|---|
| PATENT NO. | : 10,518,905 B2 | Page 1 of 1 |
| APPLICATION NO. | : 15/645671 | |
| DATED | : December 31, 2019 | |
| INVENTOR(S) | : Kevin Matthew Knott | |

It is certified that error appears in the above-identified patent and that said Letters Patent is hereby corrected as shown below:

On the Title Page

Item (73) Assignee, Line 1, delete "INNNOVATIONS" and insert --INNOVATIONS--.

Signed and Sealed this
Fourteenth Day of April, 2020

Andrei Iancu
*Director of the United States Patent and Trademark Office*